United States Patent
Kim

(10) Patent No.: US 9,749,464 B2
(45) Date of Patent: Aug. 29, 2017

(54) METHOD FOR PROVIDING INFORMATION AND AN ELECTRONIC DEVICE THEREOF

(71) Applicant: Samsung Electronics Co., Ltd, Suwon-si (KR)

(72) Inventor: Jun-Hee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/864,047

(22) Filed: Sep. 24, 2015

(65) Prior Publication Data

US 2016/0088149 A1    Mar. 24, 2016

(30) Foreign Application Priority Data

Sep. 24, 2014 (KR) .................. 10-2014-0127429

(51) Int. Cl.
*H04M 3/42* (2006.01)
*H04W 4/16* (2009.01)
*H04M 1/56* (2006.01)
*H04M 1/2745* (2006.01)

(52) U.S. Cl.
CPC ......... *H04M 3/42093* (2013.01); *H04M 1/56* (2013.01); *H04M 3/42102* (2013.01); *H04W 4/16* (2013.01); *H04M 1/27455* (2013.01); *H04M 1/274575* (2013.01); *H04M 2250/60* (2013.01)

(58) Field of Classification Search
CPC ......... H04M 3/42093; H04M 3/42102; H04M 1/56; H04M 1/27455; H04M 2250/60; H04M 1/274575; H04W 4/16
See application file for complete search history.

(56) References Cited

U.S. PATENT DOCUMENTS

| 5,883,940 A * | 3/1999 | Thornton ............ H04M 3/2218 379/111 |
| 7,542,780 B2 * | 6/2009 | Hoglander ........... H04Q 3/0025 455/426.2 |
| 8,929,517 B1 * | 1/2015 | Lavian .................. H04M 3/493 379/88.11 |
| 2005/0054381 A1 | 3/2005 | Lee et al. |

(Continued)

FOREIGN PATENT DOCUMENTS

| KR | 10-2006-0057469 | 5/2006 |
| KR | 20060057469 A | 5/2006 |

(Continued)

OTHER PUBLICATIONS

International Search Report and Written Opinion issued for PCT/KR2015/010091 dated Jan. 15, 2016, 11 pgs.

(Continued)

*Primary Examiner* — Nizar Sivji

(57) ABSTRACT

A control method and an electronic device thereof are provided. The first electronic device includes a memory for storing call logs, a determination module for analyzing the call logs associated with a dialing pattern and identifying a second electronic device associated with a recipient in the dialing pattern, and a control module for, when attempting a call to the first electronic device, outputting information of at least one second electronic device associated with the first electronic device in accordance with the stored call logs.

20 Claims, 15 Drawing Sheets

(56) References Cited

U.S. PATENT DOCUMENTS

| | | | |
|---|---|---|---|
| 2008/0260121 A1* | 10/2008 | Chin | H04M 3/2272 |
| | | | 379/93.07 |
| 2012/0202468 A2 | 8/2012 | George et al. | |
| 2013/0115930 A1 | 5/2013 | Lee et al. | |
| 2014/0162612 A1 | 6/2014 | Ma | |
| 2014/0274007 A1* | 9/2014 | Detter | H04M 3/54 |
| | | | 455/417 |

FOREIGN PATENT DOCUMENTS

| | | |
|---|---|---|
| KR | 20060119041 A | 11/2006 |
| WO | WO 2012-0015092 | 2/2012 |
| WO | WO 2014-143517 | 9/2014 |

OTHER PUBLICATIONS

Extended European Search Report issued for EP 15186731.4 dated Feb. 25, 2016, 7 pgs.

* cited by examiner

METHOD FOR PROVIDING INFORMATION AND AN ELECTRONIC DEVICE THEREOF

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 24, 2014, and assigned Serial No. 10-2014-0127429, the entire disclosure of which is hereby incorporated by reference.

TECHNICAL FIELD

The present disclosure relates generally to a method and an electronic device for providing information associated with a caller.

BACKGROUND

As electronic devices have rapidly developed, the electronic device for wireless voice communication and information exchange system has become one of necessities in life. In the early supply of the electronic device, the electronic device is considered merely as a portable terminal allowing the wireless communication. As electronic device is being evolved with wireless Internet techniques, the electronic device is expanding from a simple phone call and schedule management device to a high intelligent device providing games, remote controlling functions using a short-range communication, and image capturing functions using an embedded camera in order to satisfy user's needs.

An electronic device providing a call function can detect an input for selecting numbers displayed on a screen, an input for selecting speed dial numbers, and/or an input for selecting a user stored in phonebook data, and then attempt the call to other electronic device corresponding to the input.

When the electronic device fails to connect the call to other electronic device or the call from the electronic device is rejected by the other electronic device, a user of the electronic device may attempt the call until the call is successfully connected, or call to other user. However, the user of the electronic device needs to select the numbers displayed on the screen, the speed dial numbers, or the user stored in phonebook data in order to attempt the call to the other user.

SUMMARY

To address the above-discussed deficiencies, it is a primary object to provide an apparatus and a method for providing information of a second electronic device associated with a first electronic device in accordance with a call attempt to the first electronic device.

In one embodiment, an apparatus and a method for analyzing call logs based on a dialing pattern and providing information of a second electronic device associated with a first electronic device are provided.

In another embodiment, a method for, after attempting a call to a first electronic device, identifying other electronic device of successful call connection within a certain time as a second electronic device associated with the first electronic device are provided.

The electronic device includes a memory for storing call logs; a determination module for analyzing the call logs based on a dialing pattern and identifying a second electronic device associated with a recipient in the dialing pattern; and a control module for, when attempting a call to a first electronic device, outputting information of at least one second electronic device associated with the first electronic device based on the stored call logs.

In yet another embodiment, a method for operating an electronic device includes when attempting a call to a first electronic device, obtaining information of at least one second electronic device associated with the first electronic device based on call logs stored; and outputting the obtained second electronic device info' nation on at least part of a screen is provided. The method includes storing by a computer readable medium, a program to execute the method. The method further includes attempting a call to a first electronic device and obtaining information of at least one second electronic device associated with the first electronic device based on call logs stored. The method further includes outputting the obtained second electronic device information on at least part of a screen.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1A:
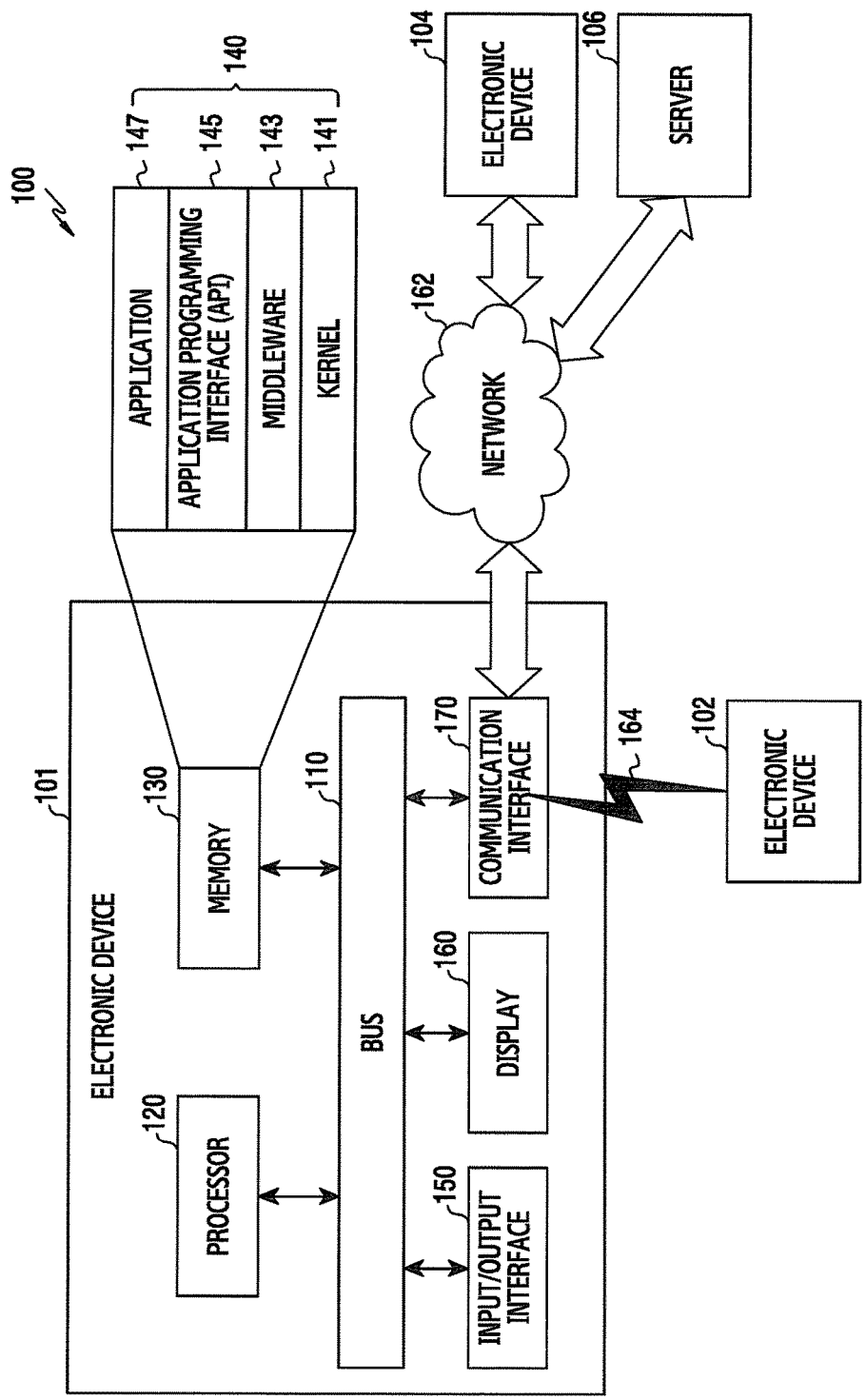
FIG. 1A is a block diagram of an example configuration of electronic device in a network according to the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, exemplary embodiments of the present disclosure are described in detail with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device can be a device including a communication function. For example, an electronic device can include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (such as a head-mounted-device (HMD) such as electronic glasses, an electronic clothing, an electronic bracelet, an electronic necklace, an electronic appcessory, an electronic tattoo, or a smartwatch).

According to certain embodiments, an electronic device can be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., such as SAMSUNG HOMESYNC™, APPLE TV™, GOOGLETV™, or the like), game consoles, an electronic dictionary, an electronic key, a camcorder, or an electronic frame.

According to certain embodiments, an electronic device can include at least one of various medical devices (such as Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (such as a navigation device for a ship, a gyro compass, etc.), an avionics, a security device, or a robot for an industrial use or a home use.

According to certain embodiments, an electronic device can include at least one of a furniture or a portion of a building/structure including a communication function, an electronic board, an electronic signature receiving device, a projector, or various measurement devices (such as waterworks, electricity, gas, or radio wave measuring device, etc.). An electronic device can be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1A is a block diagram illustrating an example configuration of a network environment 100 including an electronic device 101 according to various embodiments. As illustrated FIG. 1, the electronic device 101 includes a bus 110, a processor 120, a memory 130, an input/output (I/O) interface 150, a display 160, and a communication interface 170.

The bus 110 is a circuit for connecting the above-described elements with each other, and transferring communication (such as a control message) between the above-described elements.

The processor 120 includes a central processing unit (CPU), a communication processor (CP), a graphic processing unit (GPU).

The processor 120 receives, for example, an instruction from the above-described other elements (such as the memory 130, the I/O interface 150, the display 160, or the communication interface 170, etc.) via the bus 110, decipher the received instruction, and execute an operation or a data process corresponding to the deciphered instruction.

The memory 130 stores an instruction or data received from the processor 120 or other elements (such as the I/O interface 150, the display 160, or the communication interface 170, etc.), or generated by the processor 120 or other elements. The memory 130 includes, for example, programming modules 140 such as a kernel 141, a middleware 143, an application programming interface (API) 145, or an application 147. The each of the programming modules are configured using a software, a firmware, a hardware, or a combination of two or more of these.

The kernel 141 controls or manages system resources (such as the bus 110, the processor 120, or the memory 130, etc.) used for executing an operation or a function implemented in the rest of the programming modules, for example, the middleware 143, the API 145, or the application 147. Also, the kernel 141 provides an interface for allowing the middleware 143, the API 145, or the application 147 to access an individual element of the electronic device 101 and control or manage the same.

The middleware 143 performs a mediation role so that the API 145 or the application 147 communicates with the kernel 141 to give and take data. Also, in connection with task requests received from the applications 147, the middleware 143 performs a control (such as scheduling or load balancing) for a task request using, for example, a method of assigning priority that uses a system resource (such as the bus 110, the processor 120, or the memory 130, etc.) of the electronic device 101 to at least one application 134.

The API 145 is an interface for allowing the application 147 to control a function provided by the kernel 141 or the middleware 143, and includes at least one interface or function (such as an instruction) for file control, window control, image processing, or character control, etc.

According to various embodiments, the application 147 includes a Short Message Service/Multimedia Messaging Service SMS/MMS application, an e-mail application, a calendar application, alarm application, a health care application (such as an application for measuring quantity of motion or blood sugar, etc.), or an environment information application (such as an application providing atmospheric pressure, humidity or temperature information, etc.). Additionally or alternatively, the application 147 is an application related to information exchange between the electronic device 101 and an external electronic device (such as the electronic device 102 or 104). The application related to the information exchange includes, for example, a notification relay application for transferring specific information to the external electronic device or a device management application for managing the external electronic device.

For example, the notification relay application includes a function for transferring notification information generated from a different application (such as an SMS/MMS application, an e-mail application, a health care application, or an environment information application) of the electronic device 101 to an external electronic device (such as the electronic device 102 or 104). Additionally or alternatively, the notification relay application, for example, receives notification information from an external electronic device (such as the electronic device 102 or 104) and provide the same to a user. The device management application may manage (such a, install, delete, or update) a function (such as turn-on/turn-off of an external electronic device itself (or some constituent part) or luminance (or resolution) control of a display) of an external electronic device (such as the electronic device 102 or 104) communicating with the electronic device 101 and an application operating in the external electronic device or a service (such as a communication service or a message service) provided by the external electronic device.

According to various embodiments, the application 147 includes a designated application depending on an attribute (such as a kind of an electronic device) of the external electronic device (such as the electronic device 104). For example, in the case where the external electronic device is an MP3 player, the application 147 includes an application related to music reproduction. Similarly, in the case where the external electronic device is a mobile medical health care device, the application 147 includes an application related to health care. According to an embodiment, the application 147 includes at least one of an application designated in the electronic device 101 and an application received from the external electronic device (such as the server 106, the electronic device 102 or 104).

The I/O interface 150 transfers an instruction or data input from a user via an I/O unit (such as a sensor, a keyboard, or a touchscreen) to the processor 120, the memory 130, or the communication interface 170 via the bus 110, for example. For example, the I/O interface 150 provides data regarding a user's touch input via the touchscreen to the processor 120. Also, the I/O interface 150, for example, outputs an instruction or data received via the bus 110 from the processor 120, the memory 130, or the communication interface 170 via the I/O unit (such as a speaker or a display). For example, the I/O interface 150 outputs voice data processed by the processor 120 to a user via a speaker.

The display 160 includes, for example, a liquid crystal display (LCD), a light emitting diode (LED) display, an organic light emitting diode (OLED) display, a micro electro mechanical system (MEMS) display, or an electronic paper display. The display 160 displays various types of contents (such as text, images, videos, icons, or symbols) for users. The display 160 includes a touch screen, and receives, for example, a touch, gesture, proximity, or hovering input by using an electronic pen or a part of the user's body.

According to an embodiment, the display 160 displays a contact list based on a priority of each of the contacts included in the contact list. For example, the priority of the contacts is determined based on at least one of a transmission history, a transmission frequency, a transmission speed, a charging policy, intimacy, a counterpart's location, a schedule, or application preference.

According to an embodiment, the display 160 displays a service list based on a priority of each of the applications or services included in the service list. For example, the priority of the applications or services are determined based on configuration information of a service provider, configuration information of a manufacturer, contact information, application preference, user preference, a use time point, a distance from a target to share contents, a transmission history, and a charging policy.

The communication interface 170 connects a communication between the electronic device 101 and an external device (such as the electronic device 104 or the server 106). For example, the communication interface 170 is connected to a network 162 through wireless communication networks or wired communication networks, and communicates with an external device.

The wireless communication techniques use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM) as a cellular communication protocol.

The wireless communication technique includes at least one of for example, WiFi, BLUETOOTH® (BT), BLE, ZIGBEE®, Infrared (IR) communication, and ultrasonic communication as a short-range communication protocol 164.

The wired communication technique includes, for example, at least one of universal serial bus (USB), high definition multimedia interface (HDMI), recommended standard 232 (RS-232), and plain old telephone service (POTS).

The network 162 includes at least one of communication networks such as a computer network (such as a LAN or a WAN), the Internet, and a telephone network.

The electronic devices 102 and 104 are devices of the same type as that the electronic device 101 or devices of different types from that of the electronic device 101. According to an embodiment, the server 106 includes a group of one or more servers. According to various embodiments, all or some of the operations executed in the electronic device 101 are carried out in another electronic device or a plurality of electronic devices (such as the electronic device 102 or 104 and the server 106). According to an embodiment, when the electronic device 101 performs some functions or services automatically or by a request, the electronic device 101 makes a request for performing at least some functions related to the functions or services to another device (such as the electronic device 102 or 104, or the server 106) instead of performing the functions or services by itself or additionally. The electronic device (such as the electronic device 102 or 104, or the server 106) carries out the functions requested by the electronic device 101 or additional functions and provide results thereof to the electronic device 101. The electronic device 101 provides the requested functions or services to another electronic device based on the received results or after additionally processing the received results. To this end, for example, cloud computing, distributed computing, or client-server computing technology are used.

Figure 1B:
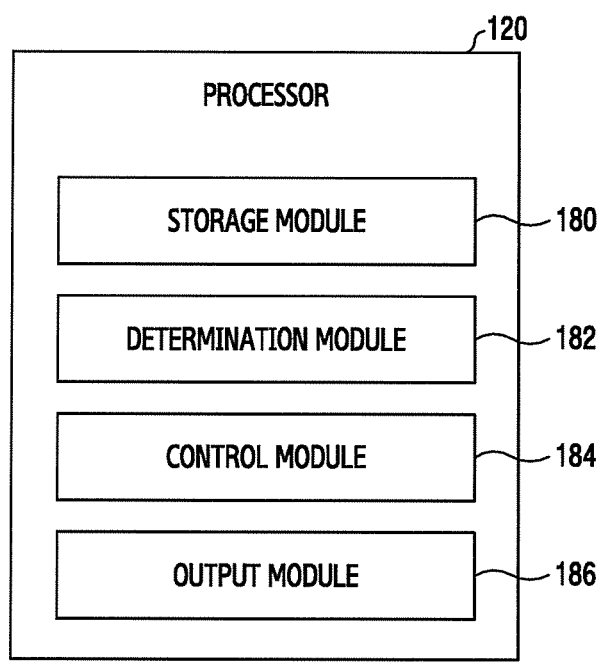
FIG. 1B is a block diagram of an example processor configuration according to the present disclosure.

FIG. 1B is a block diagram of an example processor configuration according to the present disclosure.

The processor 120 is included in an electronic device (such as the electronic device 101 of FIG. 1A) or a peripheral device (such as the external electronic devices 102 and 104 of FIG. 1A).

The processor 120 includes a storage module 180, a determination module 182, a control module 184, and an output module 186.

The storage module 180 stores a program for controlling the electronic device, and various information for determining an electronic device associated with a recipient (such as a receiving electronic device). The recipient includes at least one electronic device stored in phonebook data of the storage module 180.

The information is related to call logs. For example, the call logs includes messages sent and received, calls dialed and received, e-mails sent and received, and data sent and received. The information includes call contents. For example, the call contents can include data of a recorded call. The information includes image data, schedule data, or memo data.

The information is generated and stored by the electronic device, or received and stored from an external electronic device (such as a wearable device) connected for communication or an external server (such as the server 106 of FIG. 1A).

The determination module 182 determines a second electronic device (such as an electronic device used by a user associated with a user of a first electronic device) associated with the receiving electronic device (such as the first electronic device) corresponding to the recipient based on at least part of the information stored in the storage module 180. The first electronic device includes at least one electronic device, for example, electronic devices stored in the phonebook of the electronic device.

The determination module 182 determines the second electronic device associated with the first electronic device based on the call logs stored in the electronic device.

The determination module 182 determines whether the stored call logs satisfy a predefined dialing pattern. The dialing pattern is related to consecutive call attempts. For example, after failing in the call connection to the first electronic device, the electronic device attempts the call within a certain time by changing the recipient to the second electronic device. In this case, the determination module 182 determines that the first electronic device of the failed call is associated with the second electronic device of the following call attempt. This implies that the user of the electronic device fails in the call connection to a first user (the user of the first electronic device) and then makes the call associated with the first user to a second user (the user of the second electronic device).

The determination module 182 determines relevance based on at least one of the number of the calls attempted to the first electronic device and a call duration of the second electronic device. For example, when the call connection to the first electronic device fails a few times (such as five times) and then the call is connected to the second electronic device during a certain time (such as five minutes) by attempting the call to the second electronic device within a certain time (such as five seconds), the determination module 182 determines that the first electronic device and the second electronic device are associated with each other. When not satisfying at least one of the number of the calls attempted to the first electronic device and the call duration of the second electronic device, the determination module 182 determines that the first electronic device and the second electronic device are not associated with each other. For example, when failing in the call connection to the first electronic device a few times (such as five times), attempting the call to the second electronic device within a certain time (such as five seconds), and failing in the call connection for a certain time (such as five minutes), the determination module 182 determines that the first electronic device and the second electronic device are not associated with each other.

The determination module 182 identifies the second electronic device associated with the first electronic device based on at least one of the stored call logs, time information, and location information. The time information and the location information are used to extract at least part of the call logs stored in the electronic device. For example, the determination module 182 determines whether the call logs associated with a predefined time (such as AM, PM, office hours, bedtime, etc.) satisfy a predefined dialing pattern. For example, when generating the call logs, the electronic device adds the location information to the call logs. In this case, the determination module 182 determines whether the call logs associated with a predefined location (such as home, office, Seoul, etc.) satisfy a predefined dialing pattern. In this case, the determination module 182 identifies the second electronic device associated with the first electronic device corresponding to a specific time or a specific location. For example, the associated second electronic device differs according to a region of the first electronic device.

When satisfying the predefined condition, the determination module 182 verifies the relevance of the first electronic device and the second electronic device based on the call logs stored in the electronic device. The predefined condition is determined based on time information. For example, the determination module 182 verifies the relevance of the electronic device based on the logs stored at predefined time intervals (such as 1 day). The predefine condition is determined based on call log update information. For example, the determination module 182 verifies the relevance of the electronic device based on the recorded logs when a new call log is recorded or the pre-stored logs are updated over a threshold (such as 50%).

The determination module 182 determines the second electronic device associated with the first electronic device based on data (such as recording data, memo data, or schedule data) associated with the first electronic device stored in the electronic device.

The determination module 182 obtains information for recognizing the second electronic device by analyzing the data associated with the first electronic device stored in the electronic device.

For example, when recognizing data (such as, user name or phone number stored in the phonebook data) indicating the second electronic device from the recording data (such as call recording data of the electronic device and the first electronic device) associated with the first electronic device, the determination module 182 determines that the first electronic device and the second electronic device are associated with each other. For example, when a name of the user of the second electronic device is recorded in the call contents of the first electronic device, the determination module 182 determines that the first electronic device and the second electronic device are associated with each other. For example, when recognizing data indicating the second electronic device in the schedule data of the first electronic device, the determination module 182 determines that the first electronic device and the second electronic device are associated with each other.

The determination module 182 determines the second electronic device associated with the first electronic device based on image data stored in the electronic device. The determination module 182 recognizes a face in the image data stored in the electronic device and obtain the relevance of the electronic device corresponding to the recognized face. For example, when a first user and a second user are captured in the image, the determination module 182 recognizes the two faces in the image. The determination module 182 obtains tag information (such as name, phone number, etc.) tagged on the recognized faces. For example, the determination module 182 obtains information (such as name, phone number, etc.) corresponding to the recognized faces by comparing the faces recognized in the captured image with an image stored in the phonebook data. As such, the face recognized in one image is used to obtain the relevance of the electronic device.

The determination module 182 stores the relevance information of the electronic devices in the storage module 180. For example, the determination module 182 manages the information of the relevant second electronic devices of the electronic devices in a database.

The determination module 182 defines a class of the relevance information. The determination module 182 defines the relevance class based on the number of the calls, the call duration, and the call interval to the second electronic device associated with the first electronic device.

The control module 184 processes to output the information of at least one second electronic device associated with the first electronic device.

When detecting the call attempt to the first electronic device, the control module 184 processes to obtain the information of at least one second electronic device associated with the first electronic device based on the relevance information managed by the determination module 184.

The control module 184 processes to output the obtained second electronic device information when the electronic device successfully connects the call to the first electronic device. When detecting an input for the second electronic device, the control module 184 attempts the call to the second electronic device so that the second electronic device participates in the connected call of the first electronic device.

The control module 184 processes to output the obtained second electronic device information when the electronic device fails to connect the call to the first electronic device. When detecting the input for selecting the second electronic device, the control module 184 attempts the call to the second electronic device so as to communicate with the second electronic device. When the call connection to the first electronic device fails and then the call connection to the second electronic device associated with the first electronic device is successful, the control module 184 processes to send a message notifying the call connected to the second electronic device, to the first electronic device.

The output module 186 outputs a screen related to the operation of the electronic device. When the electronic device attempts the call to the first electronic device, the output module 184 outputs the screen of the call attempt.

When the electronic device succeeds or fails in the call connection to the first electronic device, the output module 186 outputs the second electronic device information associated with the first electronic device, on at least part of the screen.

When outputting the information of the second electronic devices, the output module 186 divides the second electronic devices based on the relevance of the electronic devices, for example, based on the relevance class. For example, the output module 186 applies a particular effect to the second electronic device of a high relevance among the second electronic devices associated with the first electronic device, to thus distinguish it from the other second electronic devices.

Although not depicted, the processor 120 includes a communication module for supporting a radio communication interface. The radio communication interface can include a cellular communication protocol. For example, the communication module can communicate with a base station via an antenna to thus send a transmit signal to the base station over the antenna and receive a signal over the antenna. For example, the radio communication interface can include a short-range communication protocol. For example, the communication module can support BT low energy (BLE), BT, infrared data association (IRDA), near field communication (NFC), and radio frequency identification (RFID).

Figure 2:
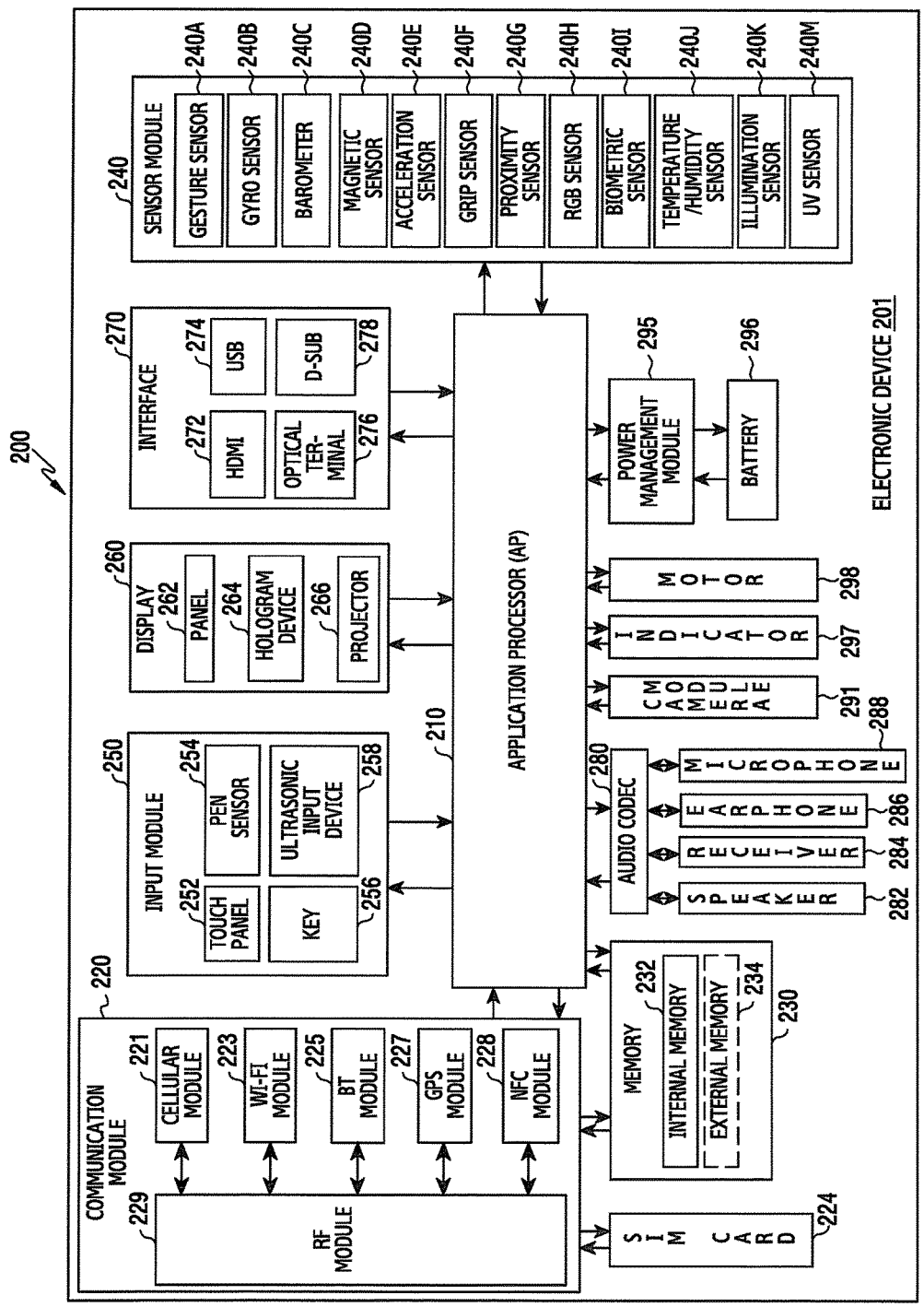
FIG. 2 is a block diagram of an example electronic device according to the present disclosure.

FIG. 2 is a block diagram of an example electronic device 201 according to the present disclosure. The electronic device 201 configures, for example, all or a portion of the electronic device 21 illustrated in FIG. 1. As illustrated in FIG. 2, the electronic device 201 includes one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 drives an OS or an application to control a plurality of hardware or software elements connected to the AP 210, and performs various data processes including multimedia data and operations. The AP 210 is implemented, for example, as a system on chip (SoC). According to an embodiment, the AP 210 further includes a graphic processing unit (GPU) (not shown).

The communication module 220 (such as the communication interface 160) performs data transmission/reception in communication between the electronic device 201 (such as the electronic device 21) and other electronic devices (such as the electronic device 24 or the server 26) connected via a network. According to an embodiment, the communication module 220 includes a cellular module 221, a Wi-Fi module 223, a BT module 225, a GPS module 227, an NFC module 228, and a Radio Frequency (RF) module 229.

The cellular module 221 provides a voice communication, an image communication, a short message service, or an Internet service, etc. via a communication network (such as LTE, LTE-A, CDMA, WCDMA, UMTS, WiBro, or GSM, etc.). Also, the cellular module 221 performs discrimination and authentication of an electronic device within a communication network using, for example, a subscriber identify module (such as a SIM card 224). According to an embodiment, the cellular module 221 performs at least a portion of functions that is provided by the AP 210. For example, the cellular module 221 performs at least a portion of a multimedia control function.

According to an embodiment, the cellular module 221 includes a communication processor (CP). Also, the cellular module 221 is, for example, implemented as a system on chip (SoC). Though elements such as the cellular module 221 (such as a communication processor), the memory 230, or the power management module 295, etc. are illustrated as elements separated from the AP 210 in FIG. 2, according to an embodiment, the AP 210 is implemented to include at least a portion (such as the cellular module 221) of the above-described elements.

According to an embodiment, the AP 210 or the cellular module 221 (such as a communication processor) loads an instruction or data received from at least one of a non-volatile memory and other elements connected thereto onto a volatile memory, and process the same. Also, the AP 210 or the cellular module 221 stores data received from at least one of other elements or generated by at least one of other elements in a non-volatile memory.

Each of the Wi-Fi module 223, the BT module 225, the GPS module 227, or the NFC module 228 includes, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (such as two or more elements) of the cellular module 221, the Wi-Fi module 223, the BT module 225, the GPS module 227, or the NFC module 228 is included in one Integrated Circuit (IC) or an IC package. For example, at least a portion (such as a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 is implemented as one SoC.

The RF module 229 performs transmission/reception of data, for example, transmission/reception of an RF signal. The RF module 229 includes, for example, a transceiver, a power amp module (PAM), a frequency filter, or a low noise amplifier (LNA), etc., though not shown. Also, the RF module 229 further includes a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 performs transmission/reception of an RF signal via a separate RF module.

The SIM card 224 is a card including a subscriber identify module, and inserted into a slot formed in a specific position of the electronic device. The SIM card 224 includes unique identify information (such as integrated circuit card identifier (ICCID)) or subscriber information (such as international mobile subscriber identity (IMSI)).

The memory 230 (such as the memory 20) includes a built-in memory 232 or an external memory 234. The built-in memory 232 include, for example, at least one of a volatile memory (such as dynamic RAM (DRAM), static RAM (SRAM), synchronous dynamic RAM (SDRAM)) and a non-volatile memory (such as one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 is a solid state drive (SSD). The external memory 234 further includes a flash drive, for example, compact flash (CF), secure digital (SD), micro secure digital (Micro-SD), mini secure digital (Mini-SD), extreme digital (xD), or a memory stick. The external memory 234 is functionally connected with the electronic device 201 via various interfaces. According to an embodiment, the electronic device 201 further includes a storage device (or a storage medium) such as a hard drive.

The sensor module 240 measures a physical quantity or detects an operation state of the electronic device 201, and convert the measured or detected information to an electric signal. The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (such as, RGB (red, green, blue) sensor), a living body sensor 240I, a temperature/humidity sensor 240J, an illuminance sensor 240K, or an ultra violet (UV) sensor 240M. Additionally or alternatively, the sensor module 240 includes, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 further includes a control circuit for controlling at least one sensor belonging thereto.

The input unit 250 includes a touch panel 252, a (digital) pen sensor 254, a key 256, or an ultrasonic input unit 258. The touch panel 252 recognizes a touch input using at least one of capacitive, resistive, infrared, or ultrasonic methods. Also, the touch panel 252 further includes a control circuit. A capacitive touch panel performs detection by a physical contact or proximity recognition. The touch panel 252 further includes a tactile layer. In this case, the touch panel 252 provides a tactile reaction to a user.

The (digital) pen sensor 254 is implemented using, for example, a method which is the same as or similar to receiving a user's touch input, or using a separate sheet for detection. The key 256 includes, for example, a physical button, an optical key or keypad. The ultrasonic input unit 258 is a unit for recognizing data by detecting a sound wave using a microphone (such as a microphone 288) in the electronic device 201 via an input tool generating an ultrasonic signal, and enables wireless recognition. According to an embodiment, the electronic device 201 receives a user input from an external device (such as a computer or a server) connected to the communication module 220 using the communication module 220.

The display 260 (such as the display 150) includes a panel 262, a hologram device 264, or a projector 266. The panel 262 is, for example, a liquid crystal display (LCD), or an active-matrix organic light-emitting diode (AM-OLED), etc. The panel 262 is implemented, for example, such that it is flexible, transparent, or wearable. The panel 262 is configured as one module together with the touch panel 252. The hologram device 264 shows a three-dimensional image in the air using interferences of light. The projector 266 projects light onto a screen to display an image. The screen may be positioned, for example, inside or outside the electronic device 201. According to an embodiment, the display 260 further includes a control circuit for controlling the panel 262, the hologram device 264, or the projector 266.

The interface 270 includes, for example, a high-definition multimedia interface (HDMI) 272, a universal serial bus (USB) 274, an optical interface 276, or a D-subminiature (D-sub) 278. The interface 270 may be included, for example, in the communication interface 160 illustrated in FIG. 1. Additionally or alternatively, the interface 270 includes, for example, a mobile high-definition link (MHL) interface, a secure digital (SD) card/multi-media card (MMC) interface, or an infrared data association (IrDA) standard interface.

The audio module 280 converts a sound and an electric signal in dual directions. At least a partial element of the audio module 280 is included, for example, in the I/O interface 140 illustrated in FIG. 1. The audio module 280 processes sound information input or output via, for example, a speaker 282, a receiver 284, an earphone 286, or a microphone 288, etc.

The camera module 291 is a device that may shoot a still image and a moving picture. According to an embodiment, the camera module 291 includes one or more image sensors (such as a front sensor or a rear sensor), a lens (not shown), an image signal processor (ISP) (not shown), or a flash (not shown) (such as an LED or xenon lamp).

The power management module 295 manages power of the electronic device 201. Though not shown, the power management module 295 includes, for example, a power management integrated circuit (PMIC), a charger integrated circuit (IC), or a battery or a battery or fuel gauge.

The PMIC is mounted, for example, inside an integrated circuit or a SoC semiconductor. A charging method is classified into a wired charging method and a wireless charging method. The charging IC charges a battery and prevent introduction of an overvoltage or an overcurrent from a charger. According to an embodiment, the charging IC includes a charging IC for at least one of the wired charging method and the wireless charging method. The wireless charging method is, for example, a magnetic resonance method, a magnetic induction method, or an electromagnetic wave method, etc., and additionally includes an additional circuit for wireless charging, for example, a circuit such as a coil loop, a resonance circuit, or a rectifier, etc.

The battery gauge measures, for example, a remnant of the battery 296, a voltage, a current, or a temperature while charging. The battery 296 stores or generates electricity, and supply power to the electronic device 201 using the stored or generated electricity. The battery 296 includes, for example, a rechargeable battery or a solar battery.

The indicator 297 displays a specific state of the electronic device 201 or a portion thereof (such as the AP 210), for example, a booting state, a message state, or a charging state, etc. The motor 298 converts an electric signal to mechanical vibration. Though not shown, the electronic device 201 includes a processor (e.g., a GPU) for supporting a mobile TV. The processor for supporting the mobile TV processes media data corresponding to standards, for example, such as digital multimedia broadcasting (DMB), digital video broadcasting (DVB), or a media flow, etc.

Figure 3:
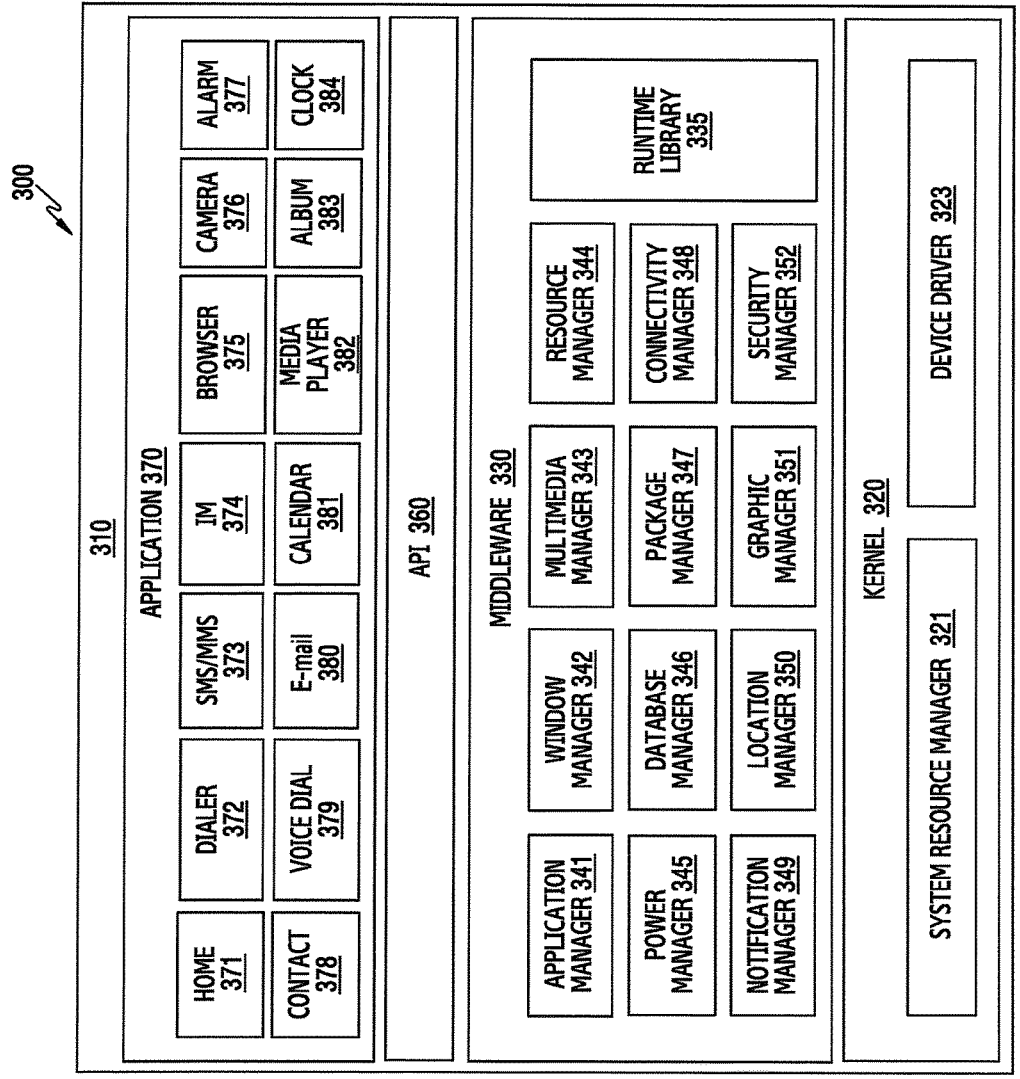
FIG. 3 is a block diagram of an example configuration of program module according to the present disclosure.

FIG. 3 is a block diagram of an example configuration 300 of a program module 310 according to the present disclosure.

According to an embodiment, the program module 310 (such as the programs 140) includes an Operating System (OS) for controlling resources related to the electronic device (such as the electronic device 100) and/or various applications (such as the application programs 147) executed in the operating system. The operating system is, for example, Android, iOS, Windows, Symbian, Tizen, Bada, or the like.

The programming module 310 includes a kernel 320, a middleware 330, an API 360, and/or applications 370. At least some of the program module 310 are preloaded in the electronic device or downloaded from the server.

The kernel 320 (such as the kernel 141 of FIG. 1) includes, for example, a system resource manager 331 or a device driver 333. The system resource manager 331 controls, allocates, or collects the system resources. According to an embodiment, the system resource manager 331 includes a process management unit, a memory management unit, or a file system management unit. The device driver 333 includes, for example, a display driver, a camera driver, a BT driver, a shared-memory driver, a USB driver, a keypad driver, a WiFi driver, an audio driver, or an Inter-Process Communication (IPC) driver.

The middleware 330 provides a function required by the applications 370 in common or provide various functions to the applications 370 through the API 360 so that the applications 370 efficiently use limited system resources within the electronic device. According to an embodiment, the middleware 330 (such as the middleware 143) includes, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes, for example, a library module that a compiler uses to add new functions through a programming language while the application 370 is executed. The runtime library 335 performs input/output management, memory management, or a function for an arithmetic function.

The application manager 341 manages, for example, a life cycle of at least one of the applications 370. The window manager 342 manages graphical user interface (GUI) resources used by a screen. The multimedia manager 343 grasps formats required for the reproduction of various media files, and performs an encoding or decoding of the media file by using a codec suitable for the corresponding format. The resource manager 344 manages resources such as a source code, a memory, and a storage space of at least one of the applications 370.

The power manager 345 operates together with a basic input/output System (BIOS) to manage a battery or power and provides power information required for the operation of the electronic device. The database manager 346 generates, search for, or change a database to be used by at least one of the applications 370. The package manager 347 manages the installation or the updating of applications distributed in the form of a package file.

The connectivity manager 348 manages wireless connection of, for example, Wi-Fi or BT. The notification manager 349 displays or notifies of an event such as an arrival message, promise, proximity notification, and the like in such a way that does not disturb a user. The location manager 350 manages location information of the electronic device. The graphic manager 351 manages graphic effects to be provided to a user and user interfaces related to the graphic effects. The security manager 352 provides all security functions required for system security or user authentication. According to an embodiment, when the electronic device (such as electronic device 100) has a call function, the middleware 330 further includes a telephony manager for managing a voice call function or a video call function of the electronic device.

The middleware 330 includes a middleware module for forming a combination of various functions of the aforementioned components. The middleware 330 provides modules specialized according to types of operating systems in order to provide differentiated functions. Further, the middleware 330 dynamically removes some of the existing components or add new components.

The API 360 (such as the API 145) is, for example, a set of API programming functions, and a different configuration thereof is provided according to an operating system. For example, Android or iOS provides one API set per platform, and Tizen may provide two or more API sets per platform.

The applications 370 (such as the application programs 147) includes, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (such as measure exercise quantity or blood sugar), or environment information (such as, atmospheric pressure, humidity, or temperature information).

According to an embodiment, the applications 370 include an application (hereinafter, referred to as an "information exchange application" for convenience of the description) supporting info nation exchange between the electronic device (such as the electronic device 100) and an external electronic device. The information exchange application includes, for example, a notification relay application for transferring predetermined information to an external electronic device or a device management application for managing an external electronic device.

For example, the notification relay application includes a function of transferring, to the external electronic device, notification information generated from other applications of the electronic device 100 (such as an SMS/MMS application, an e-mail application, a health management application, or an environmental information application). Further, the notification relay application may receive notification information from, for example, a control device and provide the received notification information to the user. The device management application manages (such as install, delete, or update), for example, a function for at least a part of the external electronic device communicating with the electronic device (such as turning on/off the external electronic device itself (or some elements thereof) or adjusting brightness (or resolution) of a display), applications executed in the external electronic device, or services provided from the external electronic device (such as a telephone call service or a message service).

According to an embodiment, the applications 370 includes an application (such as health management application) designated according to attributes of the external electronic device (such as attributes of the electronic device such as the type of electronic device which corresponds to a mobile medical device). According to an embodiment, the applications 370 includes an application received from the external electronic devices (such as the server or the electronic device). According to an embodiment, the applications 370 include a preloaded application or a third party application which is downloaded from the server. The names of the components of the program module 310 according to the embodiment illustrated in FIG. 3 varies according to the type of operating system.

An electronic device includes a memory for storing call logs, a determination module for analyzing the call logs based on a dialing pattern and identifying a second electronic device associated with a recipient in the dialing pattern, and a control module for, when attempting a call to a first electronic device, outputting information of at least one second electronic device associated with the first electronic device based on the stored call logs.

The dialing pattern includes a pattern which fails in a call connection to the first electronic device and then attempts a call connection to other electronic device by changing the recipient within a certain time.

The determination module identifies the associated second electronic device with respect to each electronic device in the call logs.

The dialing pattern is related to at least one of time information and location information.

The call logs include at least one of a call history, a message history, and an e-mail history.

The determination module determines a relevance class based on a calling frequency to the second electronic device associated with the recipient.

The control module outputs the information of the second electronic device based on at least one of a size, a color, and a shape according to the relevance class.

The control module attempts a call to the second electronic device according to an input to the output information of the second electronic device.

The call logs are generated by at least one of an electronic device, an external device connected to the electronic device, and a server.

When receiving a call connection, the control module provides the information of the second electronic device associated with the electronic device, to a calling electronic device.

Figure 4:
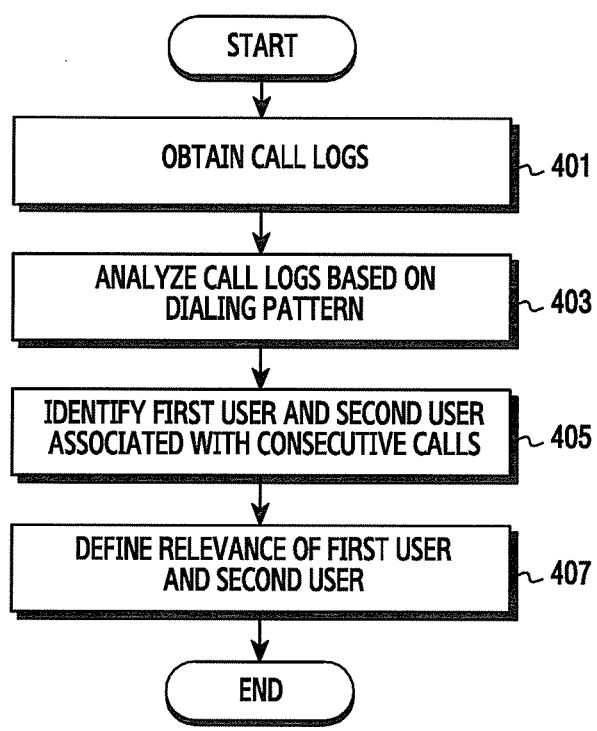
FIG. 4 is a flowchart of an example method for obtaining relevance information of an electronic device according to the present disclosure.

FIG. 4 is a flowchart of an example method for obtaining relevance information of an electronic device according to the present disclosure.

The electronic device manages second electronic device information associated with a first electronic device, in the database. The first electronic device includes at least one electronic device, for example, the electronic devices stored in phonebook data of the electronic device.

In operation 401, the electronic device obtains call logs. The call logs includes at least one of messages sent and received, calls dialed and received, e-mails sent and received, and data sent and received.

In operation 403, the electronic device analyzes the call logs based on a dialing pattern. The dialing pattern is related to the consecutive call attempts. The dialing pattern is a pattern of attempting the call in succession by changing a recipient. For example, the dialing pattern fails in a call connection to the first electronic device and then attempts the call within a certain time by changing the recipient to a second electronic device.

In operation 405, the electronic device identifies the first electronic device (such as the user of the first electronic device) and the second electronic device (such as the user of the second electronic device) in relation to the consecutive calls. The first electronic device is the electronic device to which the electronic device makes the first call, and the second electronic device is the electronic device corresponding to the changed recipient of the electronic device according to the call failure of the first electronic device.

In operation 407, the electronic device defines the relevance to the first electronic device and the second electronic device. The relevance implies that the call is connected to the second electronic device in the call connection to the first electronic device.

Figure 5:
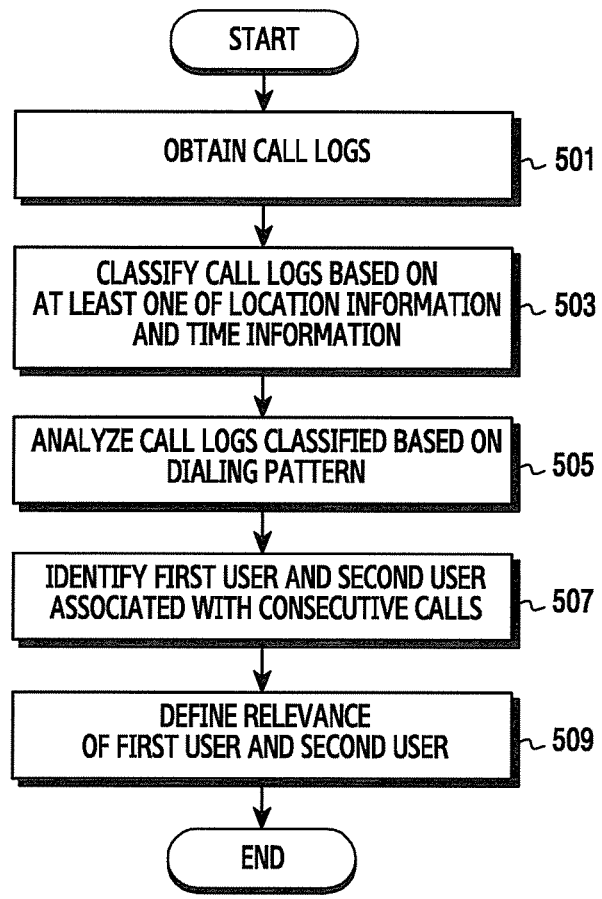
FIG. 5 is a flowchart of another example method for obtaining relevance information of an electronic device according to the present disclosure.

FIG. 5 is a flowchart of another example method for obtaining relevance information of an electronic device according to the present disclosure. In FIG. 5, an identical or similar operation to the operations of FIG. 4 is omitted.

In operation 501, an electronic device obtains the stored call logs.

In operation 503, the electronic device obtains relevance information by selecting some of the obtained call logs. The electronic device classifies the call logs based on at least one of location information and time information. For example, the electronic device classifies the call logs generated during the time when the condition is satisfied. For example, as generating the call logs, the electronic device stores the location information corresponding to the generated logs and classifies the call logs generated at a location satisfying the condition.

In operation 505, the electronic device analyzes the call logs classified based on at least one of the location information and the time information, based on a dialing pattern associated with the consecutive call attempts.

In operation 507, the electronic device identifies the first electronic device (such as a user of the first electronic device) and the second electronic device (such as a user of the second electronic device) in relation to the consecutive calls.

In operation 509, the electronic device defines the relevance to the first electronic device and the second electronic device.

Figure 6:
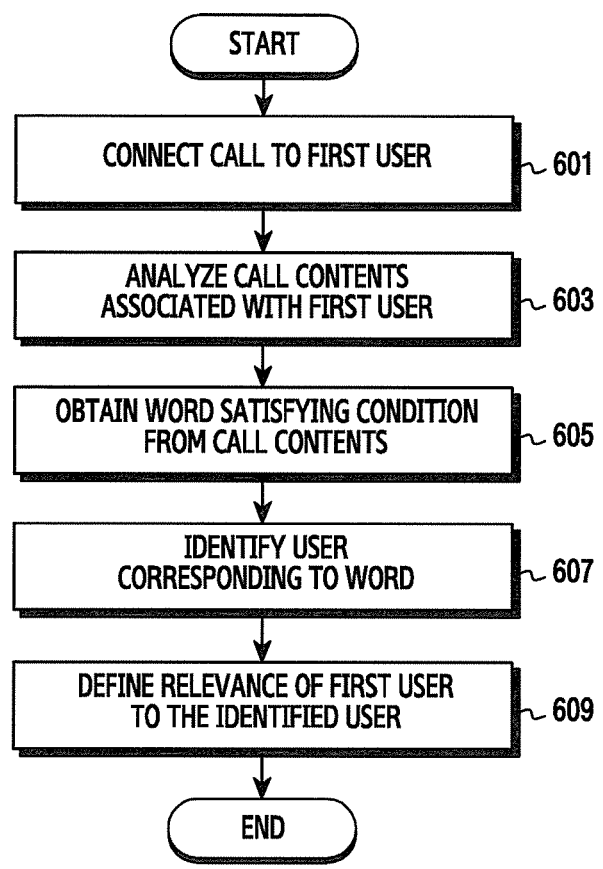
FIG. 6 is a flowchart of another example method for obtaining relevance information of an electronic device according to the present disclosure.

FIG. 6 is a flowchart of another example method for obtaining relevance information of an electronic device according to the present disclosure. In FIG. 6, an identical or similar operation to the operations of FIG. 4 is omitted.

In operation 601, an electronic device attempts a call to a first electronic device (such as a user of the first electronic device).

In operation 603, the electronic device analyzes the call contents related to the first electronic device. The electronic device extracts and analyzes information for determining a second electronic device associated with the first electronic device from the call contents related to the first electronic device.

In operation 605, the electronic device obtains the information satisfying a condition, for example, a word for determining the second electronic device from the call contents. The condition includes at least one of the user name and the user phone number stored in phonebook data of the electronic device.

In operation 607, the electronic device identifies the user satisfying the condition by comparing the information obtained from the call contents, for example, a word satisfying the condition with the phonebook data. The electronic device defines the electronic device of the user corresponding to the word satisfying the condition, as the second electronic device.

In operation 609, the electronic device defines the relevance to the first electronic device and the second electronic device.

While the electronic device analyzes the call contents after the call connection in FIG. 6, the electronic device identifies the second electronic device associated with the first electronic device by analyzing the call contents stored therein.

Figure 7:
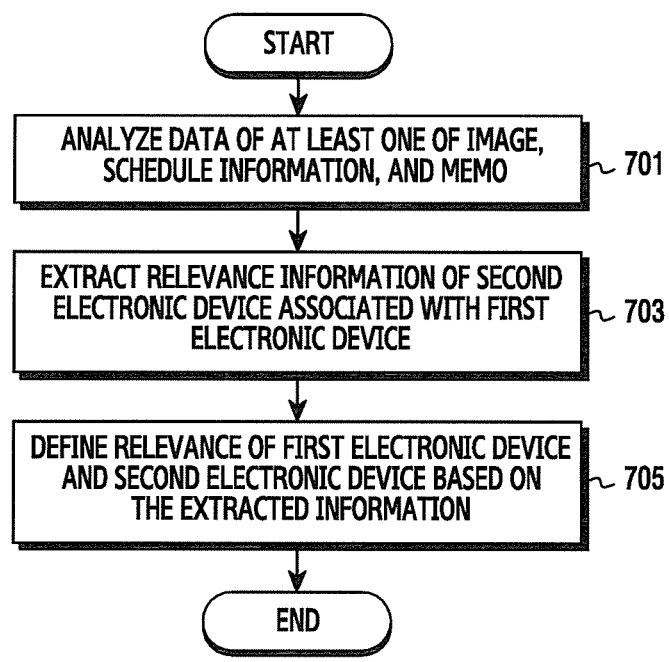
FIG. 7 is a flowchart of another example method for obtaining relevance information of an electronic device according to the present disclosure.

FIG. 7 is a flowchart of another example method for obtaining relevance information of an electronic device according to the present disclosure. In FIG. 7, an identical or similar operation to the operations of FIG. 4 is omitted.

In operation 701, an electronic device analyzes data including information for determining a second electronic device. The information for determining the second electronic device includes at least one of user name and user phone number stored in phonebook data of the electronic device. The electronic device obtains and analyzes at least one data of image data, schedule data, and memo data including the information.

In operation 703, the electronic device extracts the information of the first electronic device and the second electronic device associated with the first electronic device from the obtained data. When obtaining and analyzing the memo data recording a plurality of users and schedules, the electronic device extracts the first electronic device information associated with at least one user and the second electronic device information associated with other users in the schedule.

In operation 705, the electronic device defines the relevance to the first electronic device and the second electronic device based on the extracted information.

Figure 8:
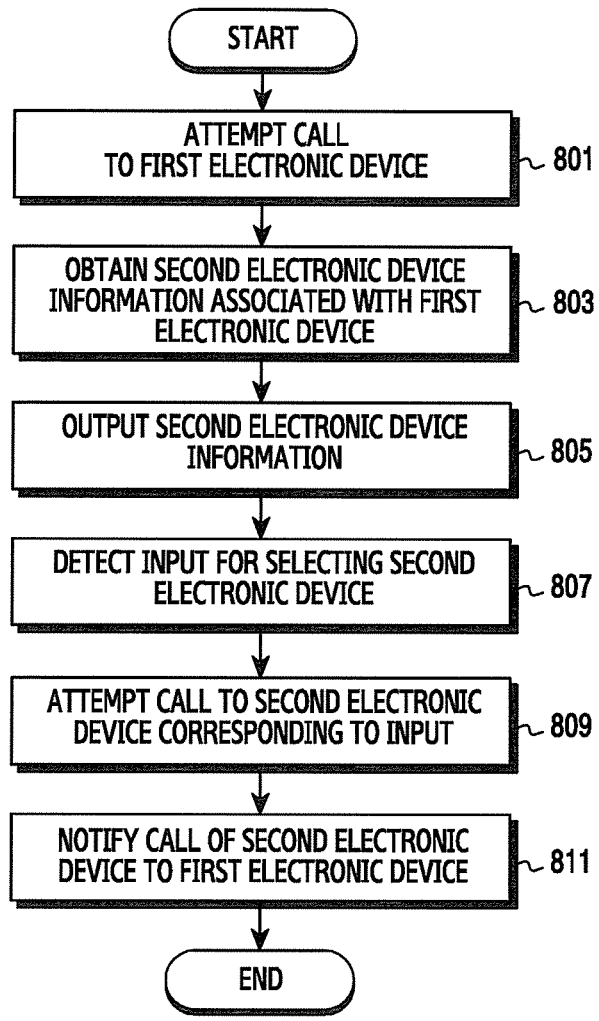
FIG. 8 is a flowchart of an example calling method in an electronic device according to the present disclosure.

FIG. 8 is a flowchart of an example calling method in an electronic device according to the present disclosure.

In operation 801, the electronic device attempts a call to a first electronic device. The first electronic device is e at least one electronic device stored in phonebook data of the electronic device.

In operation 803, the electronic device obtains a second electronic device information associated with the first electronic device. The electronic device stores the relevance information of at least one other electronic device which at least the call has been connected with and obtain second electronic device information based on the relevance information corresponding to the first electronic device which attempts the call.

In operation 805, the electronic device outputs the second electronic device information associated with the first electronic device which attempts the call, on at least part of the screen.

In operation 807, the electronic device detects an input for selecting the second electronic device.

In operation 809, the electronic device attempts the call to the second electronic device corresponding to the input. When the call connection to the first electronic device fails and the input for selecting the second electronic device is detected, the electronic device attempts the call to the second electronic device. When the second electronic device responds to the call of the electronic device, the electronic device communicates with the second electronic device.

In operation 811, when the call is connected to the second electronic device, the electronic device sends a message notifying the call connected to the second electronic device, to the first electronic device. Hence, the first electronic device which fails in the call connection to the electronic device outputs information notifying the call connection fail (such as a missed call) and information notifying that the electronic device phones the second electronic device instead.

In FIG. 8, the electronic device fails in the call connection to the first electronic device and outputs the second electronic device information associated with the first electronic device.

The electronic device succeeds at the call connection to the first electronic device and output the second electronic device information associated with the first electronic device. Furthermore, when connecting the call to the first electronic device and detecting the input for selecting the second electronic device, the electronic device attempts the call to the second electronic device. When the second electronic device responds to the call of the electronic device, the electronic device communicates with the first electronic device and the second electronic device together.

Figure 9:
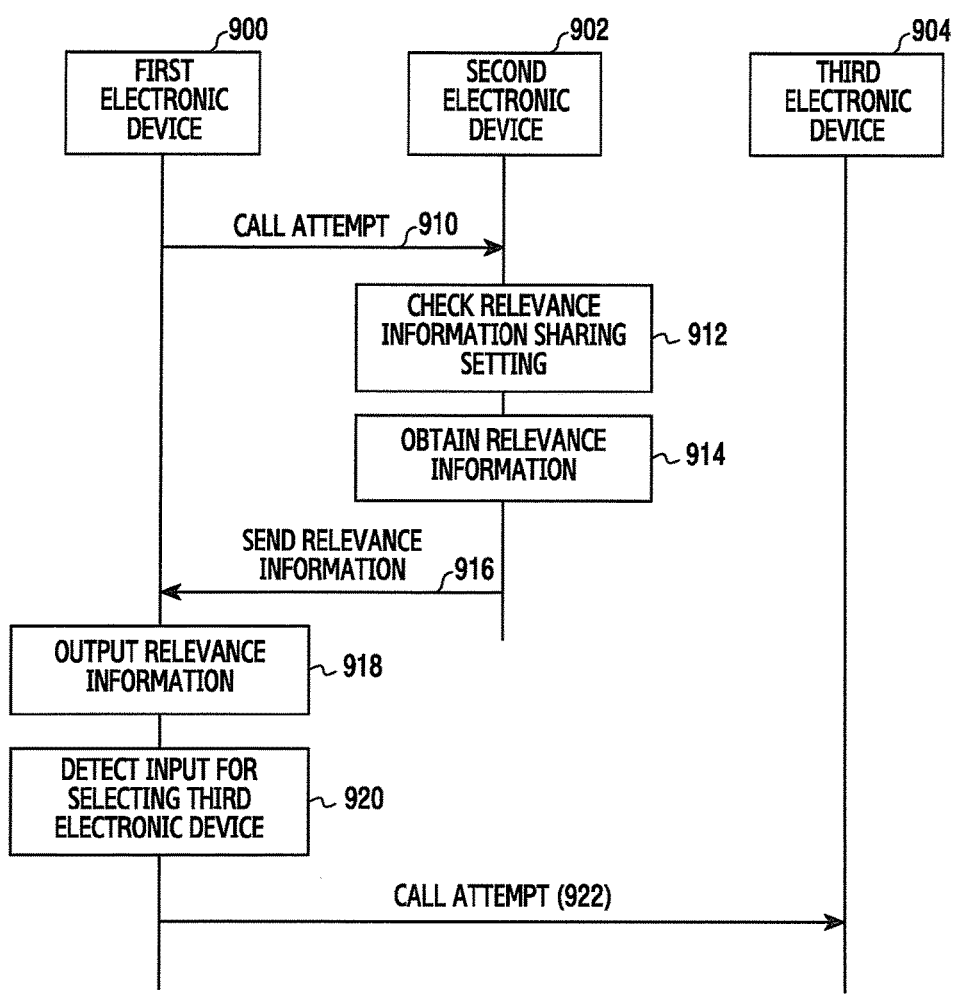
FIG. 9 is a flowchart of an example calling method according to the present disclosure.

FIG. 9 is a flowchart of an example calling method according to the present disclosure.

FIG. 9 illustrates operations of a system including a first electronic device 900, a second electronic device 902, and a third electronic device 904. The first electronic device 900 stores relevance information of the second electronic device 902 and the third electronic device 904. For example, the information of the second electronic device 902 and the third electronic device 904 are stored in phonebook data of the first electronic device 900. The third electronic device 904 is an electronic device associated with the second electronic device 902.

The first electronic device 900 is communicatively connected to an external electronic device, for example, a wearable device, and receives the information of the second electronic device 902 and the third electronic device 904 from the connected wearable device.

The first electronic device 900 attempts to connect the call to the second electronic device 902 in response to a detected call request to the second electronic device 902 in operation 910.

The second electronic device 902 checks a setting of a relevance information sharing function in response to the call connection attempt of the first electronic device 900 in operation 912.

The relevance information sharing function shares the relevance information managed by the second electronic device 902 with the electronic device (such as the first electronic device 900) attempting the call. The relevance information includes information of other electronic device (such as the third electronic device 904) defined by the user, for example, information of other connectable electronic device when the call is not connected to the electronic device.

When not responding to the call connection of the first electronic device 900, the second electronic device 902 checks the setting of the relevance information sharing function.

The second electronic device 902 sets the relevance information sharing function, obtain the relevance information from the second electronic device 902 or an external electronic device associated with the second electronic device 902 in operation 914, and send the obtained relevance information to the first electronic device 900 in operation 916.

The first electronic device 900 outputs the relevance information received from the second electronic device 902 in operation 918, detects the input for selecting at least one third electronic device of the relevance information in operation 920, and attempts the call to the third electronic device 904 corresponding to the input in operation 922.

Figure 10:
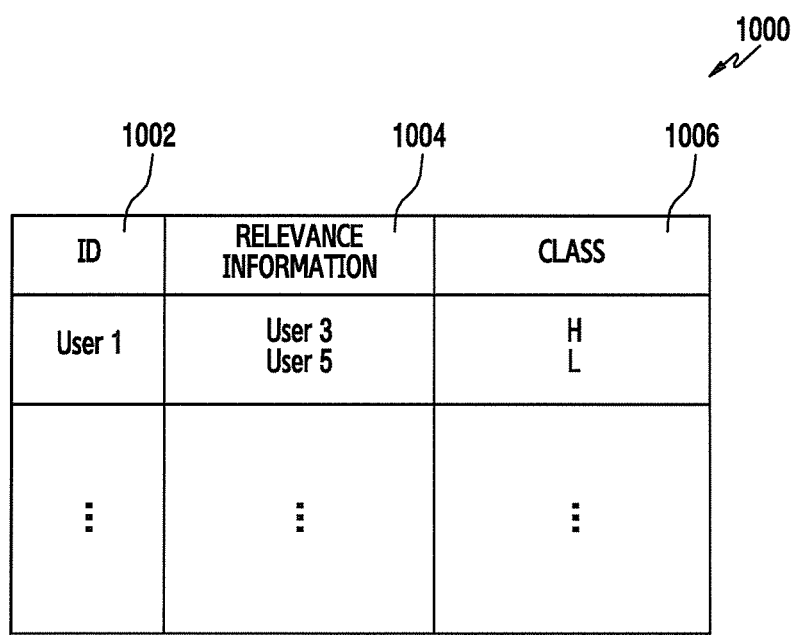
FIG. 10 is a diagram of an example relevance information according to the present disclosure.

FIG. 10 is a diagram of example relevance information according to the present disclosure.

Relevance information 1000 includes information about other phone numbers associated with phone numbers stored in phonebook data of electronic device.

The relevance information 1000 includes phone numbers (such as ID) 1002 stored in the phonebook data, phone numbers (such as relevance information) 1004 associated with the phone numbers, and the relevance information class 1006.

For example, information of a user 1 in the phonebook data includes relevance information including a user 3 and a user 5. This information implies that the electronic device fails in the call connection to the user 1 and attempts the call connection to the user 3 or the user 5 in succession. After failing in the call connection to the user 1, the electronic device defines a class based on a number of the call attempts to the user 3.

Figure 11:
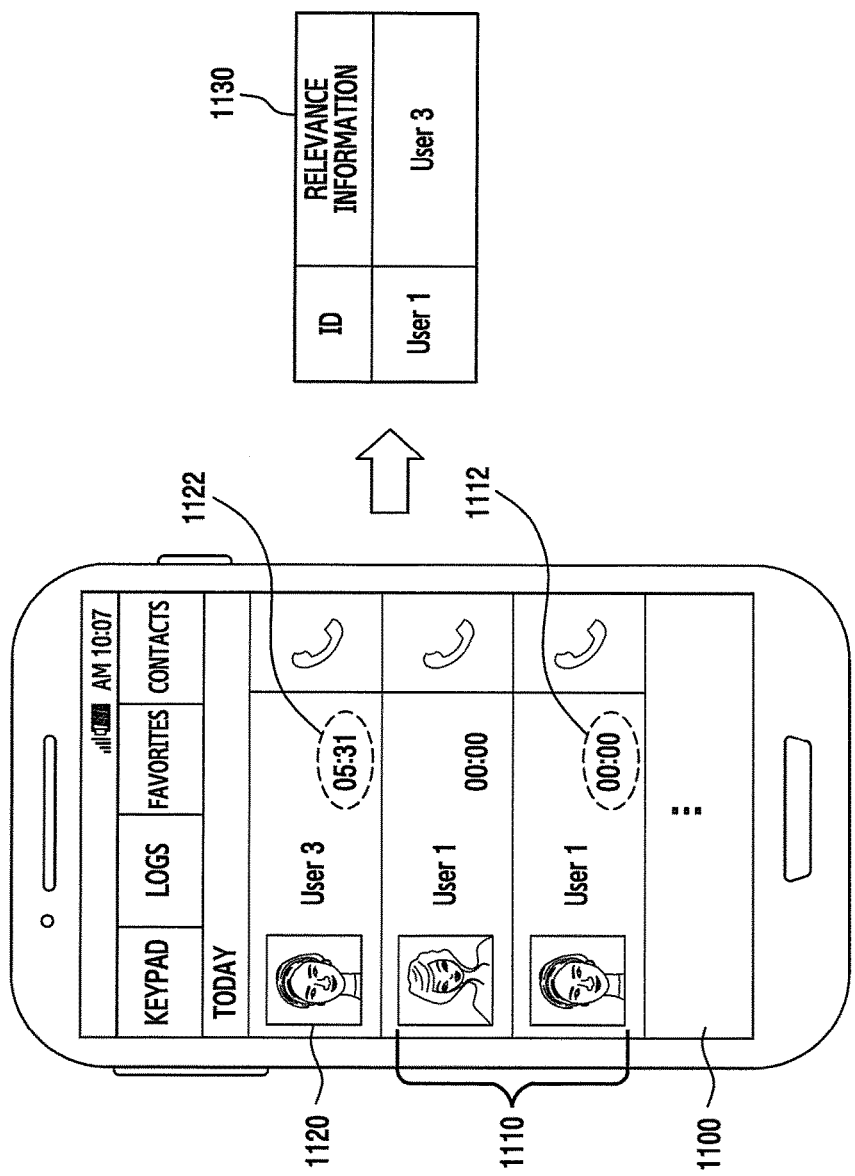
FIG. 11 is a diagram of an example relevance information management of an electronic device according to the present disclosure.

FIG. 11 is a diagram of example relevance information management of an electronic device according to the present disclosure.

An electronic device manages relevance information based on call logs 1100. The electronic device manages the relevance information of electronic devices associated with the call logs corresponding to a dialing pattern which attempts successive calls.

For example, the electronic device analyzes the call logs and obtains the dialing pattern which attempts the successive calls while changing a recipient.

As shown in FIG. 11, the electronic device obtains a dialing pattern which attempts two calls to the user 1 1110 and then a consecutive call to the user 3 1120. The electronic device confirms that the call is attempted to the user 1 1110 but not connected based on a call duration 1112 of the call logs of the user 1 1110, and that the call is connected to the user 3 1120 based on a duration 1122 of the call logs of the user 3 1120.

As detecting the dialing pattern which attempts the successive calls by changing the recipient, the electronic device determines that the previous recipient and the changed recipient are associated with each other.

For example, the electronic device records information 1130 indicating that the user 1 corresponding to the previous recipient is associated with the user 3 corresponding to the changed recipient.

Figure 12:
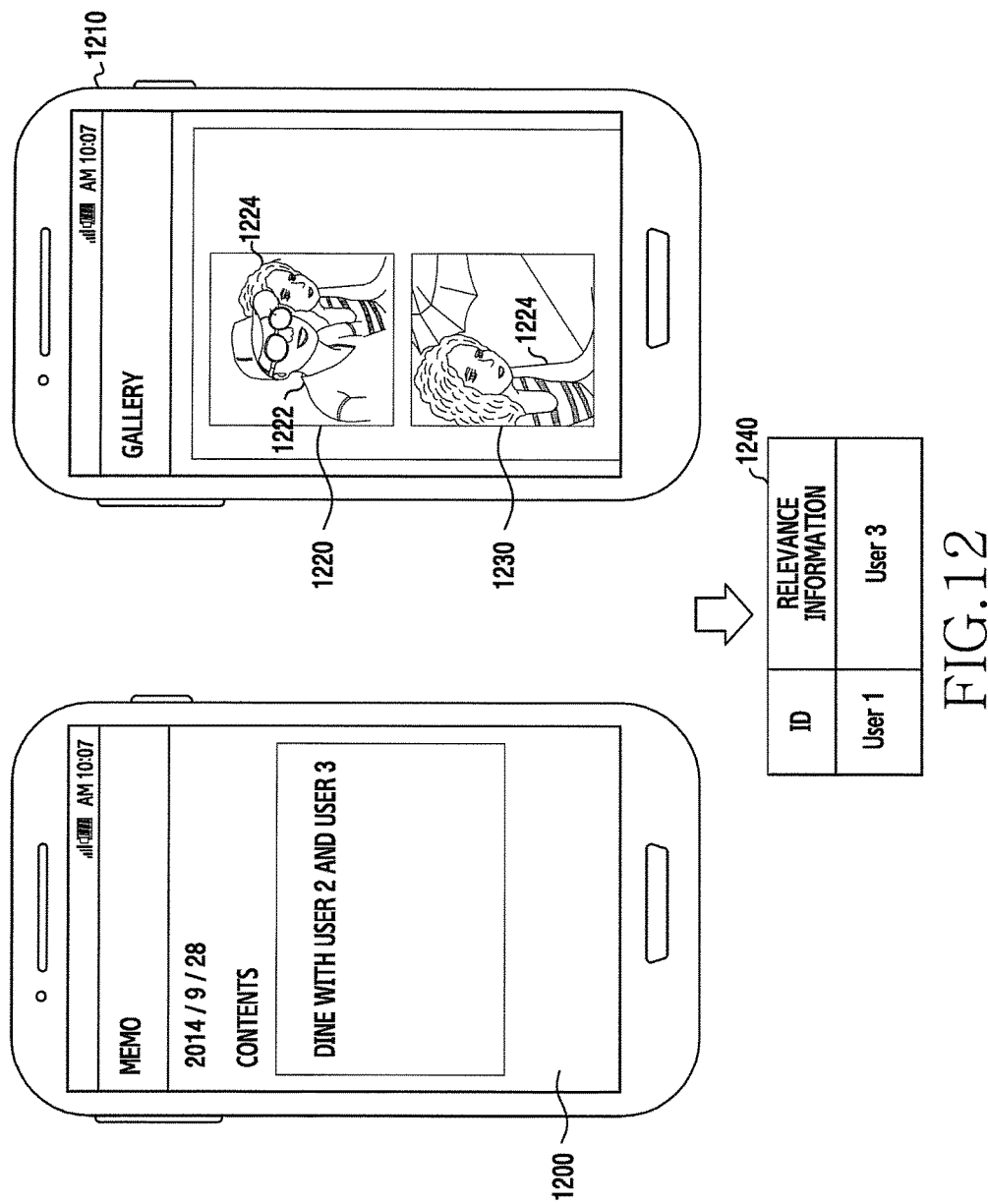
FIG. 12 is a diagram of another example relevance information management of an electronic device according to the present disclosure.

FIG. 12 is a diagram of another example relevance information management of an electronic device according to the present disclosure.

An electronic device manages relevance information based on schedule data or memo data stored. The electronic device analyzes the data and obtain information for identifying a user, for example, a name.

For example, the electronic device obtains data relating to a user 2 and a user 3, and record information 1240 indicating the user 2 and the user 3 associated with each other, in memo data 1200. Based on the schedule that the user of the electronic device dines with the user 2 and the user 3, the electronic device determines that the user 2 and the user 3 are associated each other. Thus, when failing in the call to the user 2, the electronic device automatically attempts the call to the user 3.

The electronic device manages the relevance information based on image data 1220 and 1230 stored. The electronic device at least once tag information (such as name, phone number) of persons 1222 and 1224 in the image data. The electronic device analyzes the image data and records information 1240 that the user is associated with the accompanied user. Based on the image data including the user 2 1222 and the user 3 1224, the electronic device determines that the user 2 1222 and the user 3 1224 are associated with each other.

Figure 13:
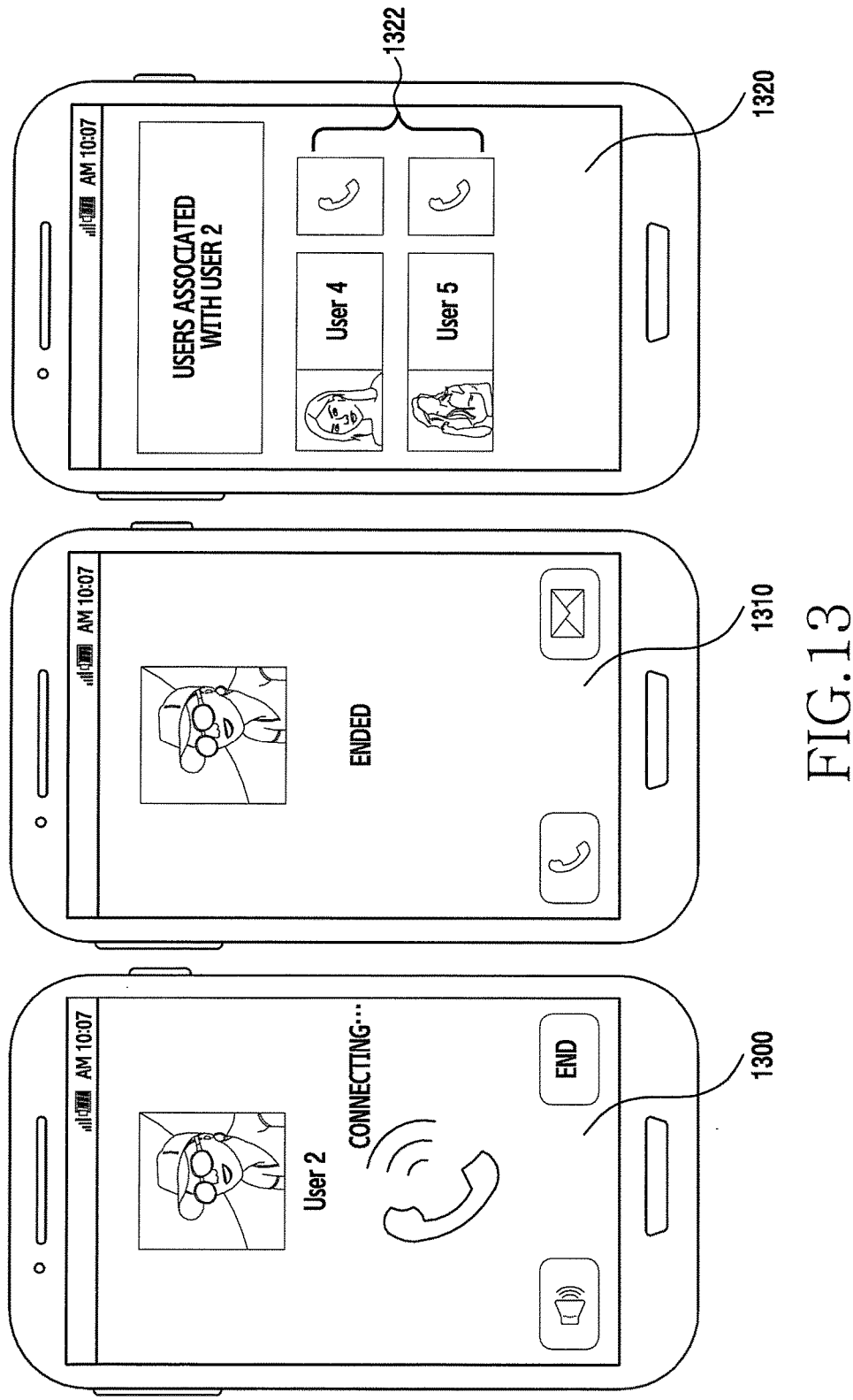
FIG. 13 is a diagram of an example call connection in an electronic device according to the present disclosure.

FIG. 13 is a diagram of an example call connection in an electronic device according to the present disclosure.

An electronic device attempts a call 1300 to a user 2 in response to a detected user input.

When failing in the call connection to the user 2, the electronic device outputs a screen 1310 notifying the call connection failure.

The electronic device identifies a user associated with the user 2 in response to the call connection failure, and output information 1322 of the identified user on a screen 1320.

In FIG. 13, the electronic device outputs information of the user 4 and the user 5 associated with the user 2 and the screen for calling the associated users.

Figure 14:
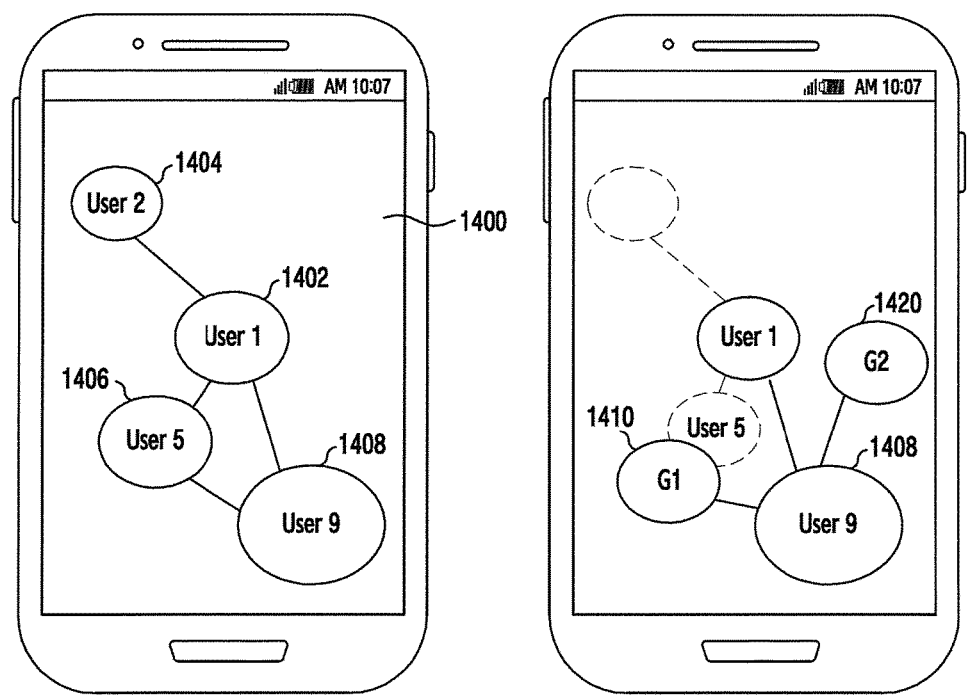
FIG. 14 is a diagram of an example output operation in an electronic device according to the present disclosure.

FIG. 14 is a diagram of an example output operation in an electronic device according to the present disclosure.

When attempting a call, the electronic device outputs information 1400 of a second electronic device associated with a first electronic device which is a recipient.

A user 1 1402 at a center is information associated with the first electronic device being the recipient. The information includes at least one of a profile photo, a phone number, and a user name.

Users associated with the user 1 1402 includes a user 2 1404, a user 5 1406, and a user 9 1408. The electronic device communicates with the user 1 being the recipient, and then communicates with the user 2, the user 5, and the user 9 in succession within a certain time.

The electronic device outputs information of the second electronic device based on a relevance class of the second electronic device. The electronic device adjusts a size of the output information based on the relevance class of the user 2, the user 5, and the user 9 corresponding to the second electronic device. For example, the relevance class is determined based on the number of the calls. When communicating with the first user and then communicating with the user 9 frequently, the electronic device outputs a larger size of the information of the user 9 1408 than the information of the user 2 1404 and the user 5 1406. In FIG. 14, a line connected between the user 5 1406 and the user 9 1408 stands for that the user 5 1406 is associated with the user 9 1408.

When detecting an input to the second electronic device information, the electronic device attempts the call to the second electronic device. For example, when detecting the input for selecting the user 9, the electronic device attempts the call to the user 9.

When detecting the input for selecting the second electronic device, the electronic device outputs another information of the second electronic device. For example, when detecting the input for selecting the user 9, the electronic device outputs group information of the user 9 based on the phonebook data. In FIG. 14, as the user 9 1408 belongs to a group 1 1410 and a group 2 1402, the electronic device outputs the corresponding group information according to the user input.

In certain embodiments, an electronic device includes when attempting a call to a first electronic device, obtaining information of at least one second electronic device associated with the first electronic device based on call logs stored, and outputting the obtained second electronic device information on at least part of a screen.

In certain embodiments, an electronic device obtains call logs, and identifies and stores a second electronic device associated with a recipient by analyzing the call logs based on a dialing pattern.

The dialing pattern includes a pattern which fails in a call connection to the first electronic device, and then attempts a call connection to other electronic device by changing the recipient within a certain time.

In certain embodiments, the dialing pattern is related to at least one of time information and location information.

In certain embodiments, the call logs includes at least one of a call history, a message history, and an e-mail history.

In certain embodiments, the identifying and storing of the second electronic device associated with the recipient includes determining a relevance class based on a calling frequency to the second electronic device associated with the recipient.

In certain embodiments, the outputting of the obtained second electronic device information on the at least part of the screen includes outputting the information of the second electronic device based on at least one of a size, a color, and/or a shape according to the class.

In certain embodiments, a method further includes attempting a call to a second electronic device according to an input to the output information of the second electronic device.

In certain embodiments, call logs are generated by at least one of an electronic device, an external device connector to the electronic device, and/or a server.

In certain embodiments, a computer-readable recording medium stores a program which executes a method comprising, when attempting a call to a first electronic device, obtaining information of at least one second electronic device associated with the first electronic device based on call logs stored, and outputting the obtained second electronic device information on at least part of a screen.

The term "module" used in the present disclosure refers to, for example, a unit including a combination of one or more hardware, software, or firmware. The term "module" is interchangeably used with a term such as "unit," "logic," "logical block," "component," or "circuit," etc. The term "module" refers to a minimum unit of an integrally configured part or a portion thereof. The term "module" refers to a minimum unit performing one or more functions or a portion thereof. The term "module" refers to a device that is mechanically or electronically implemented. For example, a "module" according to the present disclosure includes at least one of an Application-Specific Integrated Circuit (ASIC) chip, a Field-Programmable Gate Array (FPGA), or a programmable-logic device which are known, or will be developed in the future, and performing certain operations.

According to embodiments of the present disclosure, at least a portion of an apparatus (such as modules or functions thereof) or a method (such as, steps) according to the present disclosure is implemented as an instruction stored in a non-transitory computer-readable storage media, for example, in the form of a programming module. An instruction, when executed by one or more processors (such as the processor 120), allow the one or more processors to perform a function corresponding to the instruction. The non-transitory computer-readable storage media is, for example, the memory 130. At least a portion of a programming module is implemented (such as, executed) by, for example, the processor 120. At least a portion of the programming module includes, for example, a module, a program, a routine, sets of instructions, or a process, etc. for performing one or more functions.

The non-transitory computer-readable storage media includes a hard disk, a magnetic media such as a floppy disk and a magnetic tape, a Compact Disc Read Only Memory (CD-ROM), optical media such as a Digital Versatile Disc (DVD), magneto-optical media such as a floptical disk, and a hardware device configured for storing and performing a program instruction (such as, a programming module) such as a Read Only Memory (ROM), a Random Access Memory (RAM), a flash memory, etc. Also, the program instruction includes not only a machine language code generated by a compiler but also a high-level language code executable by a computer using an interpreter, etc. The above-described hardware device is configured to operate as one or more software modules in order to perform an operation of the present disclosure, and vice versa.

A module or a programming module according to the present disclosure includes at least one of the above-described elements, omit a portion thereof, or further include additional other elements. Operations performed by a module, a programming module, or other elements according to the present disclosure are executed in a sequential, parallel, or heuristic method. Also, a portion of the operations is executed in a different sequence, omitted, or other operations are added.

As set forth above, when a call is attempted to a first electronic device, a method and an electronic device for providing the information obtain and output the information of at least one second electronic device associated with the first electronic device on at least part of the screen, thus facilitate the call with the other user associated with the first electronic device. For example, when the call to the first electronic device fails, the call is connected to the second electronic device associated with the first electronic device without having to search for the second electronic device, and a conference call is conducted with the second electronic device associated with the first electronic device during the call with the first electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a memory storing instructions;
   a touch screen; and
   at least one processor configured to execute the stored instructions to:
   request to establish call connection with a first electronic device;
   identify whether establishing the call connection with the first electronic device failed; and
   display, based on a result of the identification, a first icon with a first size and a second icon with a second size different from the first size,
   wherein the first icon is used for establishing call connection with a second electronic device associated with the first electronic device, and
   wherein the second icon is used for establishing call connection with a third electronic device associated with the first electronic device.

2. The electronic device of claim 1, wherein the association between the first electronic device and the third electronic device is higher than the association between the first electronic device and the second electronic device, and
   wherein the second size is larger than the first size to indicate that the association between the first electronic device and the third electronic device is higher than the association between the first electronic device and the second electronic device.

3. The electronic device of claim 1, wherein the at least one processor is further configured to execute the stored instructions to request, based on detecting an input on the displayed second icon, to establish the call connection with the third electronic device.

4. The electronic device of claim 1, wherein the association between the first electronic device and the second electronic device is determined based on at least one of information on call logs, information on image data associated with the first electronic device and the second electronic device, or information on a location of the first electronic device and a location of the second electronic device, and wherein the association between the first electronic device and the third electronic device is determined based on at least one of the information on the call logs, information on image data associated with the first electronic device and the third electronic device, or information on the location of the first electronic device and a location of the third electronic device.

5. The electronic device of claim 4, wherein the call logs comprise at least one of a call history, a message history, or an e-mail history.

6. The electronic device of claim 1, wherein the at least one processor is further configured to execute the stored instructions to display information for indicating association between the second electronic device and the third electronic device with the first icon and the second icon.

7. The electronic device of claim 6, wherein the information is displayed as a line connecting the first icon with the second icon.

8. The electronic device of claim 1, wherein the at least one processor is configured to execute the stored instructions to:
receive an input for terminating to request to establish the call connection with the first electronic device; and
identify, based on the received input, that the establishing the call connection with the first electronic device is failed.

9. The electronic device of claim 1, wherein the at least one processor is further configured to execute the stored instructions to receive, from the first electronic device, information for indicating that the first electronic device is associated with the second electronic device and the third electronic device while requesting to establish the call connection with the first electronic device, and
wherein the at least one processor is configured to execute the stored instructions to display, based on the received information, the first icon with the first size and the second icon with the second size.

10. The electronic device of claim 1, wherein a color of the displayed first icon is different from a color of the displayed second icon.

11. A method of an electronic device, comprising:
requesting to establish call connection with a first electronic device;
identifying whether establishing the call connection with the first electronic device failed; and
displaying, based on a result of the identification, a first icon with a first size and a second icon with a second size different from the first size,
wherein the first icon is used for establishing call connection with a second electronic device associated with the first electronic device, and
wherein the second icon is used for establishing call connection with a third electronic device associated with the first electronic device.

12. The method of claim 11, wherein the association between the first electronic device and the third electronic device is higher than the association between the first electronic device and the second electronic device, and
wherein the second size is larger than the first size to indicate that the association between the first electronic device and the third electronic device is higher than the association between the first electronic device and the second electronic device.

13. The method of claim 11, further comprising requesting, based on detecting an input on the displayed second icon, to establish the call connection with the third electronic device.

14. The method of claim 11, wherein the association between the first electronic device and the second electronic device is determined based on at least one of information on call logs, information on image data associated with the first electronic device and the second electronic device, or information on a location of the first electronic device and a location of the second electronic device, and
wherein the association between the first electronic device and the third electronic device is determined based on at least one of the information on the call logs, information on image data associated with the first electronic device and the third electronic device, or information on the location of the first electronic device and a location of the third electronic device.

15. The method of claim 14, wherein the call logs comprise at least one of a call history, a message history, or an e-mail history.

16. The method of claim 11, further comprising displaying information for indicating association between the second electronic device and the third electronic device with the first icon and the second icon.

17. The method of claim 16, wherein the information is displayed as a line connecting the first icon with the second icon.

18. The method of claim 11, wherein the identifying that the establishing the call connection with the first electronic device is failed comprises:
receiving an input for terminating to request to establish the call connection with the first electronic device; and
identifying, based on the receiving, that the establishing the call connection with the first electronic device is failed.

19. The method of claim 11, further comprising receiving, from the first electronic device, information for indicating that the first electronic device is associated with the second electronic device and the third electronic device while requesting to establish the call connection with the first electronic device,
wherein the displaying the first icon and the second icon comprises displaying the first icon with the first size and the second icon with the second size based on the received information.

20. A non-transitory computer-readable storage medium for storing one or more programs for executing an operation of:
requesting to establish call connection with a first electronic device;
identifying whether establishing the call connection with the first electronic device failed; and
displaying, based on the identifying, a first icon with a first size and a second icon with a second size different from the first size,
wherein the first icon is used for establishing call connection with a second electronic device associated with the first electronic device, and
wherein the second icon is used for establishing call connection with a third electronic device associated with the first electronic device.

* * * * *